United States Patent Office 3,650,940
Patented Mar. 21, 1972

3,650,940
DEVICE FOR LIMITING THE POWER SUPPLY UPON SHORT-CIRCUIT BETWEEN WORKPIECE AND TOOL IN ELECTROLYTIC METAL FORMING MACHINE
Nils Bardahl, Erlangen, Germany, assignor to Siemens Aktiengesellschaft, Berlin and Munich, Germany
Filed Feb. 19, 1969, Ser. No. 800,409
Claims priority, application Germany, Feb. 24, 1968,
P 16 38 130.9
Int. Cl. B23p 1/04; B01k 3/00
U.S. Cl. 204—224
1 Claim

ABSTRACT OF THE DISCLOSURE

The supply of power to an electrolytic metal forming machine is limited in response to an abrupt voltage change between its electrodes. A control circuit connected to the device controls it to limit the power. The control circuit has a voltage-responsive input member connected in series with a capacitor between the electrodes of the machine and in shunt with the gap between the electrodes.

DESCRIPTION OF THE INVENTION

The present invention relates to an electrolytic metal forming machine. More particularly, the invention relates to a device for limiting the power supply upon short-circuit between the workpiece and the tool in an electrolytic metal forming machine.

In electrolytic metal forming machines, the forming workpiece and the processing or shaping tool are rinsed with an electrolytic liquid such as, for example, a saline solution and are brought close to each other, to within a very small distance of approximately 0.1 mm. At high currents such as, for example, 10,000 amperes, and small voltages such as, for example, 12 volts, metal ions dissolve on the workpiece, which functions as the anode, and are carried away by the flowing electrolytic liquid or electrolyte. The removal of the metal ions makes the workpiece negative relative to the tool.

An electrolytic metal forming machine of the type of the present invention is disclosed, for example, in U.S. Pat. No. 3,393,141, issued July 16, 1968, and assigned to the assignee of the present invention.

It has been suggested that energy or power be supplied to the electrolytic machinery by utilizing a direct voltage. The workpiece and the tool are supplied with a direct voltage derived from a three phase network, via an electronic three phase controller, a transformer, an uncontrolled rectifier connected to the output side, and a smoothing choke. In a DC current, the smoothing choke functions not only to smooth the direct current, but also to eliminate a short-circuit current.

Due to the small distance between the electrodes of the electrolytic machinery, short-circuits may be caused by contamination of the electrolytic liquid or by air bubbles. The high short-circuit currents constitute an additional load on the feeding apparatus and may result in localized penetrations, known as short-circuit marks, at the workpiece and the tool.

It has also been proposed that the short-circuit energy may be limited during the occurrence of a short-circuit, by a voltage control member connected in parallel with the path of the electrode. The voltage control member functions to close the AC supply during a voltage breakdown caused by the short-circuit, and also actuates a mechanical or electronic short-circuit device. The tripping voltage must be selected so low that the voltage drops caused by ripples cannot decrease below said tripping voltage. The sensitivity of the tripping is thus dependent upon the ripple in the direct voltage.

The principal object of the present invention is to provide a new and improved device for limiting the power supply upon short-circuit between the workpiece and the tool in an electrolytic metal forming machine.

An object of the present invention is to provide efficient, effective and reliable limiting of the power supply upon short-circuit between the workpiece and the tool in an electrolytic metal forming machine.

An object of the present invention is to provide a device of simple structure for limiting the power supply upon short-circuit between the workpiece and the tool in an electrolytic metal forming machine.

In accordance with the present invention, an electrolytic metal forming machine has a direct voltage power supply and responsive anode and cathode electrodes connected to the power supply and forming between each other a gap to be traversed by electrolyte when the machine is in operation. Combined with the machine is a device for limiting the supply of power to the machine in response to abrupt voltage changes between the respective electrodes. A control circuit connected to the device controls it to effect power-limiting operations. The control circuit has a voltage-responsive input member. A capacitor is connected in series with the voltage-responsive member between the respective electrodes in shunt relation to the gap.

The power-limiting device comprises current switching members connected in the power supply and having respective trigger circuits which form part of the control circuit. The control circuit comprises a transformer having a primary winding which constitutes the voltage-responsive input member. The transformer has a secondary winding and a diode connected in parallel to the secondary winding. The transformer has a transformation ratio of at least approximately 1:10 and at least 1:100.

The control circuit comprises a galvanomagnetic device having a magnetic field winding and a semiconductor member subjected to the magnetic field of the winding for transmitting to the power-limiting device a signal voltage controlled by the semiconductor member in response to changes of the field. The field winding constitutes the voltage-responsive input member of the control circuit.

The device of the present invention is based upon the premise that, as a rule, the direct voltage varies only in the positive direction, but has a relatively smaller steepness in the negative voltage direction. This permits the exclusive utilization of abrupt voltage variations in a negative direction as a criterion for tripping. This problem is solved by the device of the present invention by providing the aforedescribed series connection of a capacitor with the primary winding of a transformer in parallel with the electrode path of the electrolytic machine. The secondary circuit of the transformer comprises a diode parallel to the secondary winding and a diode connected in series with the secondary winding, which diode energizes a triggering tripping device. The capacitor absorbs relatively slow voltage variations. If, however, there is an abrupt voltage variation occurring during a short-circuit, the capacitor maintains its charge for the time being, and a differential voltage between the capacitor voltage and the direct voltage decreases at the primary winding of the transformer. Secondary currents, resulting from variations in voltage in one direction such as, for example, positive voltage pulses, are short-circuited via a diode in the secondary circuit. Negative voltage pulses are amplified, however, in accordance with the turns ratio and may be supplied to an electronic device which actuates appropriate protective devices, essentially free from inertia.

In order that the present invention may be readily carried into effect, it will now be described with reference to the accompanying drawings, wherein.

In the figures, the same components are indicated by the same reference numerals.

Figure 1:
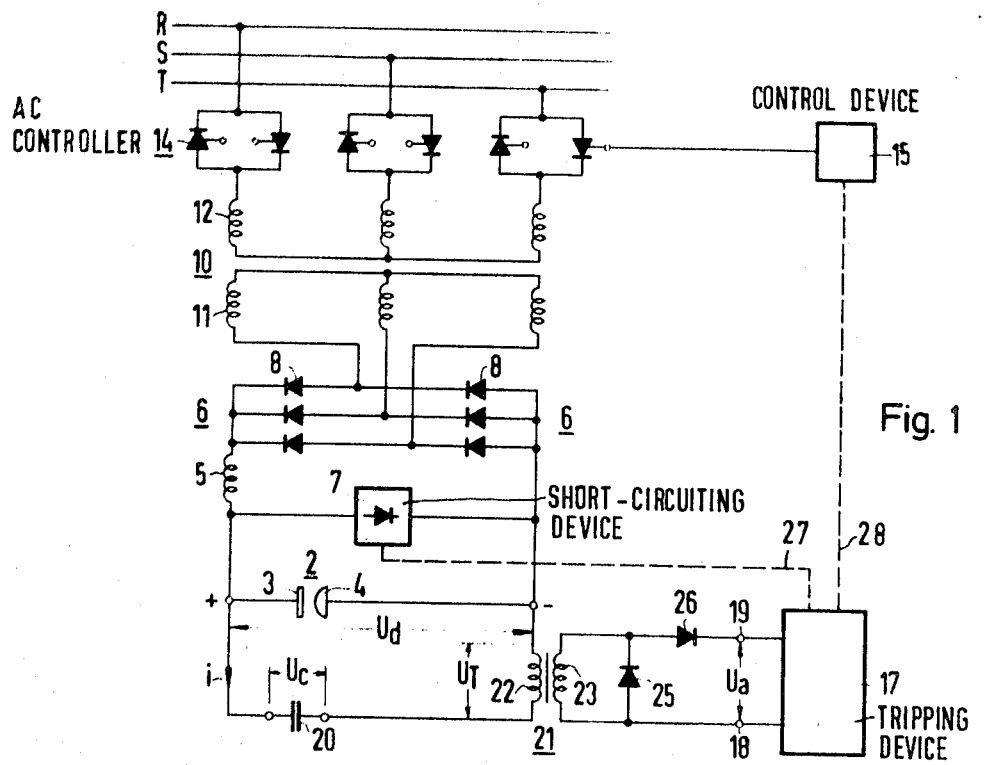
FIG. 1 is a circuit diagram of an embodiment of the device of the present invention for an electrolytic metal forming machine.

In FIG. 1, the load comprises an electrode path 2 of an electrolytic metal forming machine of the type disclosed in United States Pat. No. 3,393,141. The electrode path 2 comprises an anode 3 and a cathode 4, connected in a known manner to a three phase AC power source R, S, T via a smoothing choke or inductance 5, a rectifier 6 which preferably comprises uncontrolled semiconductor diodes 8, and a transformer 10.

The transformer 10 has a primary winding 12 and a multiphase secondary winding 11. The primary winding 12 of the transformer 10 is coupled to the three phase power supply R, S, T via an electronic AC controller 14 which is controlled by a control device 15. A short-circuiting device 7, which preferably includes electronic switching elements such as, for example, groups of thyristors, is connected in parallel with the electrode path 2 of the electrolytic metal forming machine. The short-circuiting device 7 is controlled in operation by a tripping device 17, which also preferably includes electronic switching components.

The tripping device 17 has a pair of input terminals 18 and 19 which simultaneously act upon the control device 15 of the AC controller 14. In acordance with the present invention, the input terminals 18 and 19 of the tripping device 17 are connected to a device which responds to abrupt voltage variations or changes in the load circuit of the rectifier 6. For this purpose, the electrode path 2 is connected in parallel with the series connection of a capacitor 20 and a voltage controlled transducer. The capacitor 20 has a capacitance of, for example, 0.2 microfarad, at a voltage of approximately 10 to 20 volts of the electrode path 2. The voltage controlled transducer, connected in series with the capacitor 20, comprises the primary winding 22 of a transformer 21 having a relatively small resistance and a small inductivity.

During the occurrence of voltage changes or variations having steep increasing and decreasing edges, the difference voltage between the voltage $U_d$ across the electrode path 2 and the voltage $U_c$ across the capacitor 20 decreases primarily at the primary winding 22 of the transformer 21. In order to increase the sensitivity of the tripping device 17, the transmission ratio of the transformer 21 should be selected to be appropriately high such as, for example, at least about 1:10 and preferably about 1:100. The transformer 21 has a secondary winding 23. The secondary winding 23 is connected in parallel with a diode 25 and is connected in series with another diode 26, the diode 26 being connected in series with the parallel circuit 23, 25.

Figure 2A:
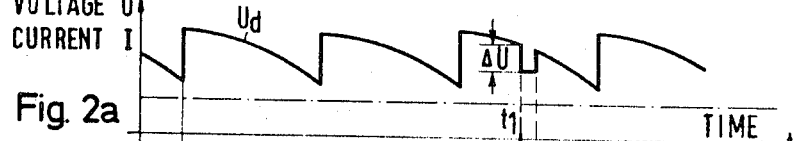
FIGS. 2a, 2b, 2c and 2d are graphical presentations of voltages and currents in the circuit of FIG. 1, for illustrating the operation of said circuit.

In each of FIGS. 2a, 2b, 2c and 2d, the abscissa represents time $t$ and the ordinate represents voltage U and current I. The load voltage or voltage across the electrode path 2, which is the voltage $U_d$, is shown in FIG. 2a.

Figure 2B:
Figure 2C:
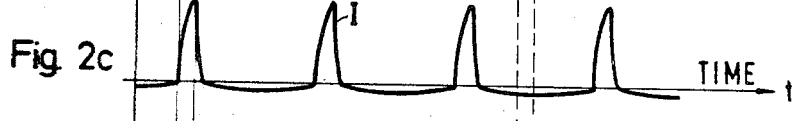

The voltage $U_c$ of the capacitor 20 is shown in FIG. 2b and is similar to the electrode path voltage $U_d$, although the voltage $U_c$ has a considerably weaker rising slope. While the capacitor 20 (FIG. 1) is charged, the charge current I, as shown in FIG. 2c, flows through the primary winding 22 of the transformer 21 and increases until the instant that the capacitor voltage $U_c$ reaches its peak value. After the instant that the capacitor voltage $U_c$ reaches its peak value, the charge current I decreases sharply or abruptly. During the decrease of the load voltage $U_d$, the capacitor 20 is discharged at a considerably lower current.

Figure 2D:
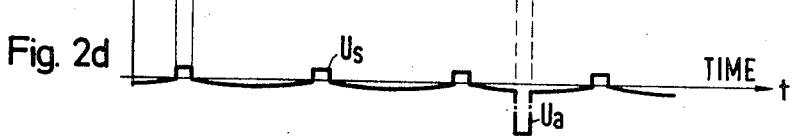

In accordance with the present invention, the voltage $U_s$ across the secondary winding 23 (FIG. 1), which voltage is shown in FIG. 2d, is limited during an increase in voltage, in one direction such as, for example, in positive direction. The secondary voltage $U_s$ may be limited, for example, by the diode 25 (FIG. 1) to the threshold voltage of said diode, as shown in FIG. 2d. In the opposite direction, which in this instance is the negative direction, the low discharge current also leads to a correspondingly lower secondary voltage $U_s$. The lower secondary voltage $U_s$ does not result in the providing of a signal by the triggering or tripping device 17.

In the event of a voltage breakdown of the load voltage at the time $t_1$, as shown in FIG. 2a, the differential or difference voltage $\Delta U$, which is the tripping voltage, and which equals the difference between the load voltage $U_d$ and the capacitor voltage $U_c$, decreases primarily at the primary winding 22 of the transformer 21. The voltage breakdown, however, has only a small effect upon the capacitor voltage $U_c$ and hardly effects the discharge current at all.

The effect of the difference voltage $\Delta U$ on the primary winding 22 of the transformer 21 produces at the secondary winding 23 thereof, however, an appropriately large voltage pulse $U_a$. The voltage pulse $U_a$ is applied via the diode 26 and the input terminals 18 and 19 to the triggering device 17. The voltage pulse $U_a$ may be utilized as a criterion for an output signal by the tripping device 17. The tripping device 17 may operate the short-circuiting device 7 essentially without inertia and, if necessary, may also close the AC controller 14 via the control device 15. Furthermore, the voltage breakdown, and particularly a short-circuit of the electrode path 2, may be indicated or signaled to a special signal device. It is usually necessary to immediately disconnect the feeding of the machine in the event of a short-circuit of the electrode path 2.

The threshold or response level of the device of the present invention, which depends upon the magnitude of the difference voltage $\Delta U$, may be adjusted, preferably by the electronic components of the tripping device 17. However, by an amplification in the input circuit of the tripping device 17, as indicated in FIG. 2d, the threshold or response level may be at a small difference voltage $\Delta U$. The device of the present invention thus has a particularly high sensitivity. Conventional protective devices of this type, with a voltage drop in the load circuit, must, on the contrary, select as the criterion for the tripping, a level so low that the tripping voltage, shown in broken lines in FIG. 2a still maintains an adequate distance from the minimum permissible levels of the load voltage $U_d$.

In the embodiment illustrated, a short-circuit diode 25 is utilized to limit the secondary voltage in the suitable direction. Other means may be suitably utilized for the same purpose, however. Thus, for example, a resistor may be utilized to limit the current. Furthermore, as shown in the modification of FIG. 6, the series connected diode 26 may be replaced by a resistor 46, or an appropriate design of the tripping device 17 may provide a response of said device only to one direction of the input voltage.

An electronic switching element having an adjustable threshold or response level which may vary the sensitivity of the tripping device 17, may be connected in the input to said tripping device. In accordance with the present invention, the transformer 21, utilized to constitute a voltage control transducer member, may be replaced by other transducers such as, for example, galvanomagnetic devices such as semiconductor resistors or field plates, or even Hall generators. A Hall generator or device 43 is utilized as the transducer in the modification of FIG. 6.

Figure 6:
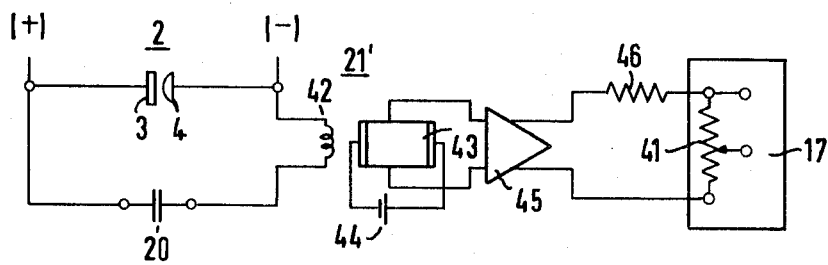
FIG. 6 is a circuit diagram of a modification of the device of FIG. 1.

In FIG. 6, which is a modification of the embodiment of FIG. 1, a transformer 21' has a primary winding 42 which is connected in series circuit arrangement with the capacitor 20. The series circuit arrangement is connected in parallel with the electrode path 2. The Hall device 43 replaces the secondary winding of the transformer 21' and is positioned in the magnetic field produced by the primary winding 42.

The current supply electrodes of the Hall device 43 are supplied with current from a DC voltage source 44. The Hall voltage electrodes of the Hall device 43 are connected to the inputs of an amplifier 45, the outputs of which are connected to the inputs of the tripping device 17 via a resistor 46. A potentiometer 41 is connected across the input terminals of the tripping device 17.

Figure 3:
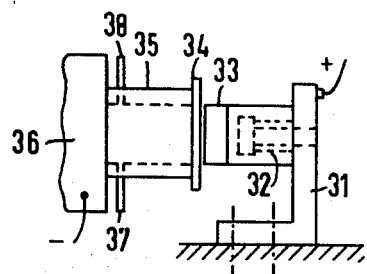
FIG. 3 is a schematic diagram of an electrolytic metal forming machine of the type disclosed in United States Pat. No. 3,393,141, and is FIG. 1a of said patent.

The contouring device shown in FIG. 3 comprises a support 31 with a chuck 32 for fastening a workpiece 33 to be contoured by electrolytical processing. The contour to be produced is determined by an annular template electrode 34 which is affixed to a tubular electrode holder 35 on a carrier 36. The carrier 36 is supported on a slider (not shown) which is displaceable on the machine frame structure by suitable feed means in a direction toward the workpiece 33. The support 31 and the holder 36 are connected to the positive and negative leads of a suitable source of electric current.

Electrolyte is supplied through inlet and outlet tubes 37 and 38 and flows through the inner space of the tubular holder 35 and between the electrode 34 and the workpiece 33. The electrolytic action then occurring between the template electrode 34 and the workpiece 33 dissolves material from said workpiece, thus shaping its contour in accordance with the template contour of the tool electrode.

Figure 4:
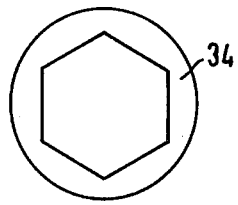
FIG. 4 is a schematic diagram of a template electrode of the machine of FIG. 3, and is FIG. 1b of United States Patent No. 3,393,141.
Figure 5:
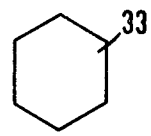
FIG. 5 is a schematic diagram of a workpiece of the machine of FIG. 3, and is FIG. 2 of United States Pat. No. 3,393,141.

As shown in FIG. 4, the contour of the template is that of a regular hexagon, so that the workpiece 33 has assumed a corresponding hexagonal shape after the tool electrode has passed over the entire length of said workpiece. The electrolyte continuously supplied during simultaneous axial displacement of the tool electrode relative to the workpiece 33 may comprise, for example, an aqueous solution of sodium chloride or sodium nitrate.

Figure 7:
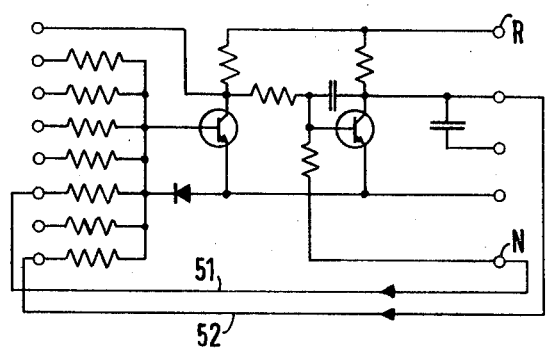
FIG. 7 is a circuit diagram of an embodiment of a trigger circuit which may be utilized as the trigger 17 of FIG. 1.

The tripping device 17 may comprise any suitable tripping device known in the art such as, for example, that disclosed on pages 807 to 809, and more particularly in FIG. 3, of the Siemens Magazine, 1964. FIG. 3 of the aforedescribed magazine is shown as FIG. 7 of the present disclosure. The sensitivity of the tripping device 17 may be determined by the selection of the input resistance. It may be adjusted, for example, when the resistance changes. The feedback paths of the tripping circuit of FIG. 7 are connected to corresponding inputs thereof via leads 51 and 52 to be connected to the output. One of the input terminals may be utilized for control purposes, one for the connection of the feedback path 52, and one for the connection of the feedback path 51 through which a compensating current may flow from the input toward the terminal point N.

The selection of the control point and the feedback paths or bridging leads may change the switching level and the hysteresis, while arbitrary intermediate values may be adjusted by resistors connected to the output.

While the invention has been described by means of specific examples and in specific embodiments, I do not wish to be limited thereto, for obvious modifications will occur to those skilled in the art without departing from the spirit and scope of the invention.

I claim:

1. With an electrolytic metal forming machine having direct voltage power supply means and respective anodic and cathodic electrode means connected to said power supply means and forming between each other a gap to be traversed by electrolyte when the machine is in operation, the combination of a device for limiting the supply of power to the electrolytic machine in response to abrupt voltage change between said respective electrode means, control circuit means connected to said device for controlling it to effect power limiting operation and having a voltage-responsive input member, said power limiting device comprising current switching members connected in said power supply means and having respective trigger circuits which form part of the control circuit means and said control circuit means comprising a galvanomagnetic device having a magnetic field winding and a Hall generator subject to the magnetic field of the magnetic field winding for transmitting to the power limiting device a signal voltage controlled by the Hall generator in response to changes of said field, said field winding constituting said voltage-responsive input member of said control circuit means, and a capacitor connected in series with said voltage-responsive input member of said control electrode means in shunt relation to said gap.

References Cited

UNITED STATES PATENTS

| | | | |
|---|---|---|---|
| 3,533,927 | 10/1970 | Manning | 204—224 X |
| 3,548,257 | 12/1970 | Drushel et al. | 204—224 X |
| 3,496,088 | 2/1970 | Pfau et al. | 204—228 X |
| 3,520,791 | 7/1970 | Pfau et al. | 204—228 X |
| 3,524,804 | 8/1970 | Götz et al. | 204—288 X |

FOREIGN PATENTS

| | | | |
|---|---|---|---|
| 958,970 | 5/1964 | Great Britain | 204—143 |

JOHN H. MACK, Primary Examiner

D. R. VALENTINE, Assistant Examiner

U.S. Cl. X.R.

204—228